Dec. 5, 1967   N. D. SMITH, JR., ETAL   3,357,001
STORING AND RECALLING SIGNALS
Original Filed Dec. 7, 1961   4 Sheets-Sheet 1
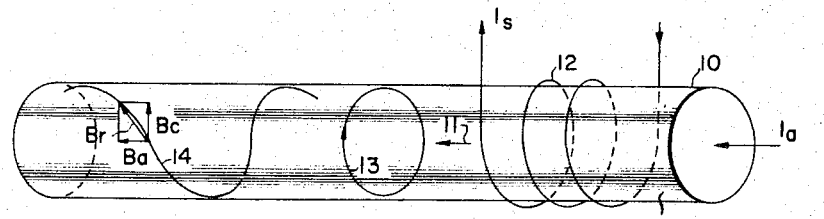
FIG. 1   MAGNETO-STRICTIVE ROD
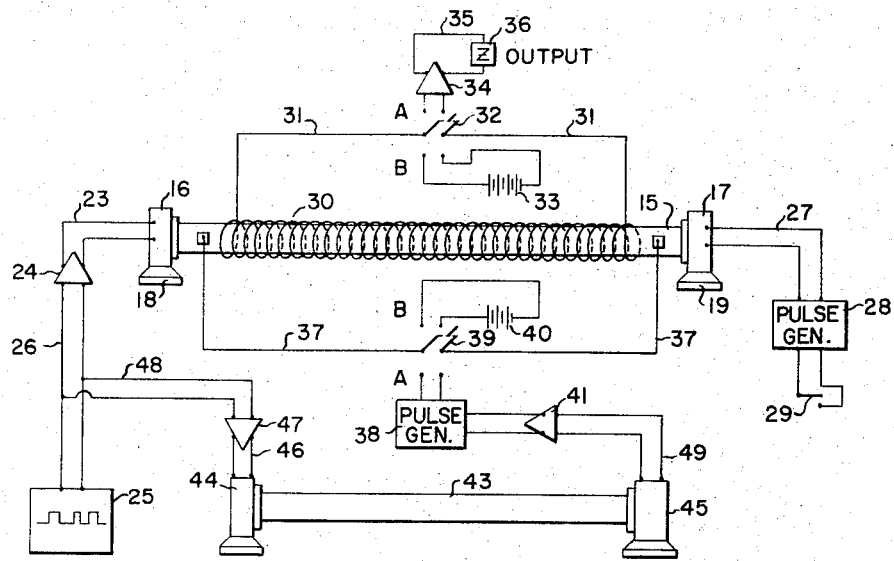
FIG. 2
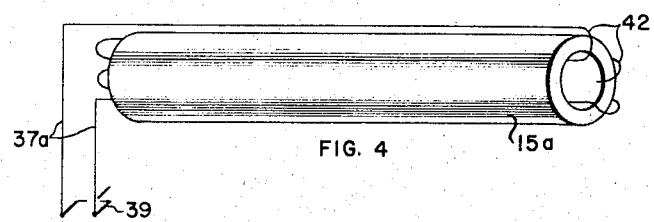
FIG. 4
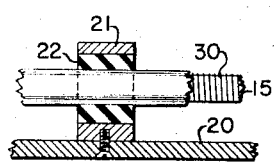
FIG. 3
INVENTORS:
NOYES D. SMITH, JR.
WILLIAM L. ROEVER
BY *Oswald H. Milmore*
THEIR ATTORNEY

INVENTORS:
NOYES D. SMITH, JR.
WILLIAM L. ROEVER
BY:
THEIR ATTORNEY

INVENTORS
NOYES D. SMITH, JR.
WILLIAM L. ROEVER
THEIR ATTORNEY

United States Patent Office 3,357,001
Patented Dec. 5, 1967

3,357,001
STORING AND RECALLING SIGNALS
Noyes D. Smith, Jr., and William L. Roever, Bellaire, Tex., assignors to Shell Oil Company, New York, N.Y., a corporation of Delaware
Original application Dec. 7, 1961, Ser. No. 157,796, now Patent No. 3,320,596, dated May 16, 1967. Divided and this application Sept. 24, 1965, Ser. No. 490,006
9 Claims. (Cl. 340—174)

ABSTRACT OF THE DISCLOSURE

A method and apparatus for storing and recalling a signal having an amplitude that varies with time. The signal is stored in a rod of magneto-strictive material by establishing a series of remanent stresses and polarizations along the length of the rod. The signal is recalled by applying a short polarizing pulse to the rod and detecting the magnitude of the recalled signal.

---

This application is a division of our application Serial No. 157,796, filed December 7, 1961, now Patent No. 3,320,596.

This invention relates to the storage and recall of information which includes signal elements forming a sequence in time. More particularly, it is concerned with a method and a device for accumulating within a storage body a series of signal elements which vary in amplitude as a function of time, sometimes called the analogue storage of information as distinguished from digital storage, and is further concerned with the recall of the information at will. The invention is applicable to computer circuitry, telephone circuitry, servo-mechanisms, data-storage systems, and the like. It may be noted that although the invention in itself deals with the analogue storage of information it may be applied as a component of or in conjunction with a digital computer or system.

It is known to store a sequence of pulses transiently in rods or elongate bodies of magneto-strictive materials for the purpose of achieving a time-delay. (See U.S. Patents No. 2,495,740 to Labin et al., January 31, 1950 and No. 2,846,666 to Epstein et al., August 5, 1958.) The signal is applied to the rod magnetically and creates a mechanical distrurbance which travels along the rod, setting up corresponding magnetic fields at one or more points displaced from the point of application; the variation in the magnetic field is detected at such displaced point as a delayed signal. The mechanical disturbances are dissipated and are not, therefore, stored within the rod so as to be subject to recall at will.

It is an object of this invention to provide a memory device and a method of storing information expressed as an amplitude which is a function of time wherein the information can be recalled at will. The said information may be a continuous function of time or may be a sequence of pulses of like or different amplitudes with equal or nonequal time intervals between them.

A further object is to provide a device and a method of recalling or reading out the information after storage according to the above object. A specific object is to effect recall of the information substantially non-destructively, so that it may be recalled repetitively without re-storage thereof after read-out. An ancillary object is to effect read-out of the stored information either in the normal or reverse order as the source signal. A further ancillary object is to effect read-out of the stored information on the same time-scale as the source signal or on a different time-scale.

In accordance with the invention use is made of an elongate body, such as a solid or tubular rod, having the properties of being polarized by the application of a polarizing stress, of retaining a remanent polarization after removal of the polarizing stress, and of exhibiting a coupling between its polarization and mechanical stress and strain. Such properties occur in magnetostrictive materials and electrostrictive materials. For convenience this class of materials is herein sometimes referred to as electro-magnetostrictive materials.

In summary, according to the invention the source train of signal elements is applied as a series of mechanical stresses—if necessary, after transformation or amplification by a suitable transducer—to an input point of an elongate, electro-magnetostrictive body, preferably after polarizing the said body, to produce mechanical stresses which travel along the length of the body as longitudinal or torsional waves, and applying a short polarizing stress to the body before the stress wave reaches the end of the body. The application of the short polarizing stress produces within the body a remanent polarization in which the magnitude at various points along the length of the body corresponds to the magnitudes of the mechanical stresses at those points at the instant that the short polarizing stress was applied. Hence the remanent mechanical stresses at spatially displaced points are fixed or "frozen" at values which correspond to the amplitudes of successive elements of the source signal which were applied at successive times.

The term "short" as used herein denotes a duration which is small in relation to the duration of the elements of the signal. After the stress wave due to the source signal has become dissipated, the remanent polarization will be different from that at the instant of the application of the short polarizing pulse but nevertheless a function of the stress at that instant. Corresponding to these remanent polarizations, there are remanent mechanical strains. Thus, the information is stored in the material, which acts as a memory device.

According to a second feature of the invention the stored information is recalled by propagating a mechanical stress through the body and observing the effect of the stress during such propagation as a function of time. This may be effected in various ways:

(1) According to one method a single, short acoustic recall pulse is initiated in the body; as this pulse travels the length of the body it changes the stress and, hence, the remanent polarization successively along the spatially displaced points along the rod. This change in remanent polarization is observed as a function of time and the information is thereby recalled. In the usual case the recall pulse is applied at or near the end of the body toward which the source wave travelled during storage thereof; the elements of information are then read off in the same time-sequence as in the source signal; one may, however, recall the information elements in reverse order by applying the recall pulse to travel along the body in the same direction as the source signal, e.g., by applying it to the other end or the point of application of the source signal.

(2) According to a second method the polarization is changed simultaneously all along the length of the body. This generates new mechanical stresses along the body which have magnitudes corresponding to the remanent stresses and polarizations, and these new stresses travel along the body as waves in both directions. These stress waves are observed by a transducer at or near one end of the body—usually at the end remote from the point of application of the source signal to reconstitute the original information in its normal sequence; however, the waves may be observed at the other end for reversing the sequence.

The recall of information is substantially nondestructive, whereby it is possible to interrogate the storage device repetitively and at will.

The mechanical stresses used to feed the source signal to the elongate body and the stress used to recall the stored information may be longitudinal or torsional and may be of the same or of different forms. Because the velocity of propagation of longitudinal waves is different from that for torsional waves the time-scale of the recalled signal may be the same as, shorter, or longer than that of the source signal, Thus, the time-scale is unaltered when both the storage and recall stresses are longitudinal or when both are torsional; it is enlarged when the former is compressional and the latter torsional, i.e., the time-scale is increased, and the recalled signal will be expanded over a longer time period; and when the former is torsional and the latter compressional, the time-scale is decreased. However, it is preferred according to the invention, whenever the storage and recall waves are of the same type, to employ torsional stresses because it leads to reduced dispersion.

The invention will be described in detail with reference to the accompanying drawings forming a part of this specification, wherein:

FIGURE 1 is a perspective view of a rod of magnetostrictive material, showing the magnetic fields discussed in the specification;

FIGURE 2 is a diagrammatic view of one embodiment of the invention, using a solid memory rod of magnetostrictive material, wherein recall is effected by applying a mechanical wave;

FIGURE 3 is a fragmentary detail view of a support at an intermediate section of the memory rod;

FIGURE 4 is a perspective view of a modified form of an electrostrictive memory rod suitable for use in the embodiment of FIGURE 2;

Figure 5:
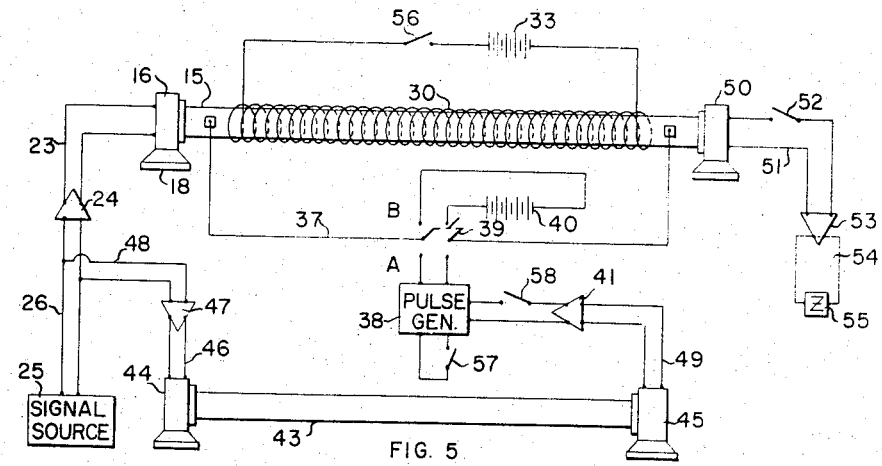
FIGURE 5 is a diagrammatic view of a modified arrangement for recalling the stored information, which involves changing the polarization simultaneously along the electrostrictive memory rod to propagate stress waves therein.

As a preliminary to a description of the invention reference is made to FIGURE 1 to explain the behaviour of electro-magnetostrictive materials. The rod 10 is of magnetostrictive material, such as nickel, a nickel alloy such as permalloy, or a ferrite. Ferrites are described by Robert L. Harvey in an article "Ferrites and Their Properties at Radio Frequencies" on pages 287–298 of vol. 9 of the Proceedings of the National Electronic Conference, 1953, and may, for example, be a material having the formula $NiO \cdot Fe_2O_3$, containing a proportion of nickel to iron in the ratio of two to one atomic weights. If such a rod is placed in a magnetic field, a stress and resultant strain is produced in the material; materials exhibiting positive or negative magneto-striction tend to expand or contract, respectively, in the direction of magnetization. Conversely, when such a material is strained, the magnetization changes. These materials exhibit remanence in magnetization and strain, and to every state of remanent magnetization there is a corresponding remanent strain: if the magnetization is varied, the strain varies, and if the strain varies the magnetization varies. An axial magnetic field 11 can be applied to the rod 10 by passing a D.C. current $I_s$ through a solenoid 12 disposed coaxially therewith. A circumferential magnetic field 13 can be set up by passing an axial D.C. current $I_a$ along the rod (or through a toroidal coil such as is shown in FIGURE 4 at 42 when the rod has a central bore).

Consider first that the axial magnetic field 11 is applied and reduced to zero. Thereafter the circumferential field 13 is applied and reduced to zero. Corresponding to each of these fields there will be a remanent magnetization. The resultant of the remanent magnetizations is shown at 14, which is the vector sum of the remanent axial magnetization $B_a$ and the circumferential remanent magnetization $B_c$. $B_r$, the resultant, is a helical field about the rod.

It is a property of magnetostrictive materials that if either a circumferential or axial field is present alone, and a torsional stress is applied to the rod, a helical field is generated. If the rod has a state of helical magnetization, then a compressional wave in the rod will produce changes in this helical field. The amounts of the changes in the magnetic fields produced by various strains are related to the magnitudes and directions of the strains.

Let us suppose that the rod has only a remanent axial magnetization, $B_a$, and that a torsional stress is applied to one end of the rod. Then, if a circumferential magnetic field is applied and both the stress and the field are removed, there will be a helical remanent magnetization which is related to the magnitude of the torsional strain. Let us suppose that the rod has been given a uniform helical remanent magnetization $B_r$. Then, if a compressive stress along the length of the rod is applied, the state of magnetization will be changed and if a large magnetic field, either axial or circumferential, is applied and removed, the remanent magnetization after the compressive stress has been removed will be related to the size of the strain. These relationships are the physical basis for the invention.

An embodiment according to the invention is shown in FIGURE 2. There is shown a memory rod 15 of magnetostrictive material having electromechanical transducers 16 and 17 fixed rigidly to the ends and electrically insulated therefrom. Transducer 16 is the signal-input transducer and 17 is used for applying a recall pulse. As was previously indicated, these transducers may be of the axial or torsional type, and the two transducers may be of the same type or different. In the embodiment under consideration both are torsional. In some constructions each transducer casing is anchored against rotation in a support 18 or 19; in others (FIG. 6) no anchor is used. Regardless of the transducer construction used, the rod is mounted for free torsional movement, e.g., unsupported between the ends thereof. Additional supports, if any, should be arranged to reduce acoustic coupling to the rod to a minimum. Moreover, with torsional transducers, axial acoustic coupling therefrom to the memory rod should be low. This can be achieved as is shown in FIGURE 3, wherein the rod 15 is supported from a base 20 by a ring 21 containing a sponge-rubber bushing 22. The input circuit 23 to the transducer 16 is connected to an amplifier 24 to which a source signal to be stored, e.g., from a source 25, is fed via a circuit 26. It should be understood that the signal may be but is not, in general, sinusoidal, but may take any form, such as a square wave (suggested in the drawing) including pulses which occur at equal or nonequal time intervals. The transducer 17 has its input circuit 27 connected to a pulse generator 28 which is controlled by a triggering device, represented by a switch 29. The generator emits, when triggered, single, short pulse of sufficient strength to impose a strong torsional stress from the transducer to the rod 15.

The rod 15 carries a helical winding 30 which is connected via a circuit 31 and a double-throw switch 32 either to a source 33 of direct current (when the switch is in its B-position) or to an output amplifier 34 (when the switch is in its A-position shown). The amplified signal is taken off via a circuit 35 to a load 36. When the switch is in its B-position the solenoid is effective to create an axial magnetic field.

The rod 15 is further provided with means for creating circumferential magnetic field. This may be a circuit 37 connected to the ends of the rod for transmitting a strong direct current pulse therethrough and connected to a pulse generator 38, preferably through a double-throw switch 39. This connection is established when the switch is in its A-position. When in its B-position the circuit 37 can be connected to a source 40 of direct current. The generator 38 is controlled by an amplifier 41.

It will be understood that other means for creating a circumferential magnetic field may be used. For example, as is shown in FIGURE 4, the rod 15a may be tubular and be provided with a toroidal winding 42 and connected to a circuit 37a to the switch 39. The other elements attached to the rod are omitted from FIGURE 4 for clarity but would be present as previously described.

A delay element of any suitable design is provided between the signal source 25 and the amplifier 41. In the illustrative embodiment it includes a delay rod 43, which may be constructed like the rod 15 and be of like material but of such length that a stress wave can travel along it before a simultaneously applied stress can travel the full length of the rod 15. The rod 43 of course need not be of magnetostrictive material. This rod is fixed to an electromechanical input transducer 44 at one end and a mechanical-electrical output transducer 45 at the other end, both being of the same type and anchored. It is evident that when the transducers 16 and 44 are of the same type, e.g., both torsional, the rod 43 must be shorter than the rod 15. The input circuit 46 of the input transducer is connected to the output side of an amplifier 47 which is connected via a circuit 48 in shunt to the source signal circuit 26, and the output circuit 49 of the transducer 45 is connected to the amplifier 41.

In operation, initially the switch 32 is placed in its B-position, thereby passing a direct current through the solenoid 30 and polarizing the rod 15 with axial magnetization. To store a signal the switch 39 is moved to its A-position and the switch 32 is opened. The remanent axial magnetization remains in the rod. The signal from the source 25 is thereafter applied simultaneously via the amplifiers 24 and 47 to the transducers 16 and 44 of the memory rod 15 and the delay rod 43, respectively. Torsional waves progress along both of the rods, with amplitudes along the rods corresponding to the successive elements of the signal. The torsional wave in the delay rod reaches the transducer 45 before the other wave reaches the end of the memory rod. The first element of the signal is amplified in the amplifier 41 to trigger the pulse generator 38 to transmit a sharp electrical pulse of direct current through the memory rod via the circuit 37. This applies a short polarizing stress simultaneously throughout the length of the rod by imposing circumferential magnetizing field. When this pulse is ended the elements of the signal are stored along the memory rod as remanent magnetizations and remanent strains.

When a tubular rod such as appears in FIGURE 4 is used the polarizing pulse is created by flowing the direct current through the winding 42 from the circuit 37a, thereby creating a similar momentary circumferential magnetizing field.

To recall the information, the switch 32 is moved to its A-position to connect the solenoid 30 to the amplifier 34; the switch 39 may be open or left in its A-position. The control device 29 is actuated to trigger the pulse generator 28 and apply a sharp electrical pulse to the transducer 17 at the end of the memory rod. A single torsional wave travels along the rod and influences the spatially separated sections thereof in succession, producing a succession of changes in magnetic field which are proportional to the remanent magnetizations and, hence, to the amplitudes of the original signal elements. The effect of this propagated stress is observed by means of the solenoid 30, the induce E.M.F. from which is amplified in the amplifier 34. The original signal is reproduced in the circuit 35 and load 36. The store signal can be recalled in this manner as many times as desired without destroying it.

When it is desired to clear the memory, the rod must be demagnetized. This can be accomplished in various ways, for example, by placing an oscillating field in the solenoid 30 and gradually reducing the amplitude of the field to zero, or by passing a sufficiently large current through the rod 15 to raise its temperature above the Curie temperature.

According to an alternative method of recalling the signal, the polarization is changed along the length of the rod 15 and the resultant mechanical waves are detected. For this purpose the device may be modified as is shown in FIGURE 5, wherein a torsional mechanical electrical transducer 50 replaces the electromechanical transducer 17. The output circuit 51 from this transducer is connected via a switch 52 to an output amplifier 53, having an output circuit 54 connected to a load 55. The solenoid 30 is connected, as before, to a source of direct current 33, but the control switch 56 is, in this case, of the single-throw type. The pulse generator 38 is provided with a control element, represented by a switch 57, and the circuit from the amplifier 41 is preferably provided with a switch 58. It is evident that the elements 53–57 correspond to elements 34–36, 32 and 29, respectively. Other elements are the same as in the previous embodiment.

The device of FIGURE 5 is used as previously described to store a signal. To recall a signal the switch 39 is placed in its A-position, the switch 52 is closed, the switch 56 is open, and the switch 58, when provided, is open. The control 57 is operated to trigger the generator 38, thereby sending a short, strong pulse of direct current through the memory rod. This changes the polarization simultaneously along the length of the rod and generates new torsional stresses at different points having magnitudes corresponding to the remanent magnetizations at those points. These stresses travel in both directions as torsional and compressional waves. Both trains reach the transducer 50 which, however, is sensitive only to one type—the torsional waves in the embodiment described. This transducer therefore generates electrical signals corresponding to the torsional waves, which are amplified at 53. The original signal (assuming that the transducer 16 was also of the torsional type) is reproduced without change in time-scale in the circuit 54 and load 55.

The system of FIGURE 5 can also operate without change in time-scale when the transducer 16 is of the compressional type and the transducer 50 is sensitive only to compressional waves. However, when the transducer 16 generates compressional waves in the storage cycle and the transducer 50 is sensitive only to torsional waves the reproduced signal will have its time-scale lengthened. Conversely, when the transducer 16 generates torsional waves and compressional waves are detected by the transducer 50 the time-scale in the reproduced signal is reduced.

Although not illustrated, it will be understood that the input and output circuits can be provided with suitable circuit elements such as gating arrangements for permitting only the desired signal to be transmitted; this may be included in the amplifier units. It may be further noted that mechanical stress waves which reach the ends of the rods are reflected but eventually die out. Thus, in recording the signal it is the condition in the memory rod at the instant that the polarizing pulse is emitted by the pulse generator 38 that determines what is recorded, and subsequent waves do not alter the stored information. During recall, a gating arrangement in the amplifier 34 or 53 or associated with the input or output of such amplifier prevents signals due to reflected waves from being included in the output. Because such gating arrangements are well known in themselves, no description of them is included.

The time duration of the signal which can be stored in this system depends upon the length of the rod and the velocity of the stress wave through the rod; the latter, in turn, depends upon the nature of the wave. The velocity of compressional waves in a thin nickel rod is 5100 meters per second, and a torsional wave is propagated with a velocity of 3200 meters per second.

Because of this difference in the velocities of progagation it is possible, as previously noted, to store the signal by one type of wave and recall it by another, e.g., in the case of FIGURE 1, record it by a compressional wave (the transducers 16, 44 and 45 being in this case of the compressional type) and recall it by a torsional wave (the transducer 17 being of the torsional type). By this method the time scale of the signal is increased by the ratio of the velocity of compressional waves to the velocity of the torsional waves. This decrease in the frequency band used by the signal is important when it is desired to transmit the signal over a cable, as from a logging instrument situated in a well some distance beneath the surface. In other words, the device according to the invention can be mounted at a transmitting station and used for the purpose of increasing the duration of a signal, whereby the signal is less subject to attenuation and/or less costly transmission cables can be employed.

The device can also be used to decrease the duration of the signal and increase the frequency of the source signal by storing the signal by means of a torsional wave and recalling it by means of a compressional wave (the transducer 17 of FIGURE 1 being in this case of the compressional type and the transducers 16, 44 and 45 of the torsional type). This arrangement would be useful in connection with electronic computers when the computation speed is greater than the speed at which information is available in the original signal source.

In describing the methods of this invention the fidelity with which the information containing signal can be stored and recalled was not discussed in order to simplify the description of the basic operation of storage and recall. Two important sources of distortion are dispersion of the elastic waves and the non-linearity of the relationships between mechanical stress, magnetomotive force and magnetization.

Longitudinal elastic waves traveling in a rod are dispersed, i.e., the velocity of the waves is a function of their wavelength. The velocity of the short wavelengths is greater than the velocity of the longer wavelength waves and consequently a signal made up of waves of different wavelengths becomes distorted as it propagates along the rod. This effect can be minimized by keeping the wavelengths of interest much longer than the radius of the rod. For example, a signal of 100 kilocycles per second will have a wavelength in a nickel rod of approximately 5 centimeters. Thus if the radius of the rod is 1 millimeter, very little dispersion will take place. Torsional waves in a rod are not dispersive, i.e., the velocity is essentially independent of the wavelength. Hence the use of torsional waves is preferred particularly for storing and recalling signals with a very short wavelength.

The distortion due to nonlinearity can be minimized by modulating a carrier wave. Amplitude modulation can be used with the amplitude of the carrier wave chosen so that amplitude variations of the signal occur about a point on the most linear portion of the function relating magnetization to strain and magnetomotive force. For example a carrier wave with a frequency of 50 kilocycles per second may be modulated by a signal covering a range of frequencies up to 10 or 20 kilocycles per second.

Frequency modulation can be used with an amplitude limiter to essentially eliminate distortion due to nonlinearity. The amplitude is chosen so as to use that portion of the function relating magnetization to strain and magnetomotive force which produces the maximum response and thus the best signal-to-noise ratio. For example, a central carrier with a frequency of 500 kilocycles per second may be used with a modulating frequency of 20 kilocycles. Because such modulating and demodulating systems are well known and would be incorporated into the signal source 25 and the output signal amplifier 34 or 53, they are not further described herein.

Figure 6:
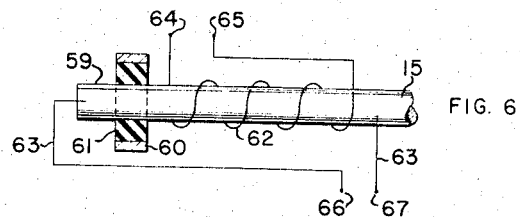
FIGURE 6 is an elevation view of a magnetostrictive transducer applied to one end of a memory rod.

A specific example of a transducer is a magnetostrictive transducer, which is shown in FIGURE 6 but not restrictive of the invention. It includes a rod 59 of magnetostrictive material which is connected to (or may be integral with and be the end section of) the magnetostrictive memory rod 15. It may also be applied to the electrostrictive memory rod to be described with reference to FIGURES 9–13. It is mounted within a support ring 60 by a foam rubber bushing 61 and forms the core of a solenoid 62, for creating an axial magnetic field. A circumferential magnetic field can be produced by passing an axial current through the rod via a circuit 63. For torsional waves a source of direct current is connected to the terminals 64, 65 of the solenoid. This current may be left on during operation of the transducer, or only the remanent polarization can be used. The input signal is applied to the terminals 66, 77, which produces a circumferential magnetic field and twists the rod to produce torsional stresses corresponding to the elements of the signal.

For compressional waves, the terminals 64 and 65 are used to pass a direct current and thereby produce remanent axial magnetization. These terminals are then connected to the signal source; the varying axial magnetization produces compressional waves.

When used as a transducer for converting torsional waves into electrical pulses, e.g., as in the case of the transducers 45 and 50, a direct current is applied to the terminals 66 and 67, and the waves produce magnetic fields in the solenoid 62, the terminals 64 and 65 then acting as the output terminals. When the transducer is to be sensitive to compressional waves, a direct current is passed through the solenoid 62 through terminals 64 and 65 to produce an axial remanent magnetization in the rod. The same terminals 64 and 65 are then used as the output terminals (via suitable D.C. blocking elements) to detect a voltage produced in coil 62 by the passage of a compressional wave through the portion of the rod covered by solenoid 62.

It will be understood that when the rod 59 lacks sufficient inertia it may be restrained mechanically to improve the transmission of stress waves into or from the rod 15. This involves matching the impedance; however, an accurate match is not essential.

Instead of using magnetostrictive material, electrostrictive materials may be used for the memory rod. These materials are members of the class of ferroelectric materials, and may be distinguished from piezoelectric materials, in that in the latter a reversal of the voltage reverses the sign of the resulting strain, whereas for the electrostrictive materials the strain is an even function of the applied voltage and the strain does not reverse sign when the voltage is reversed. The three principal types of ferroelectric crystals that may be used are the rochelle salt type, the potassium dihydrogen phosphate type, and the barium titanate type. These are described by Mason in the book "Piezoelectric Crystals and Their Application to Ultrasonics," 1950, (D. Van Nostrand Company, Inc.) page 1 and chapters XI and XII. Of these a ceramic composed principally of fused, powdered barium titanate is of particular interest. It has a very high dielectric constant—of the order of 1500—and can be permanently polarized by applying a transverse voltage, e.g., of the order of 20,000 volts per centimeter while the ceramic is above its Curie temperature, cooling it to room temperature, and thereafter removing the voltage. Polarization of such material is described by Mason in U.S. Patent No. 2,742,614, April 17, 1956.

Figure 7:
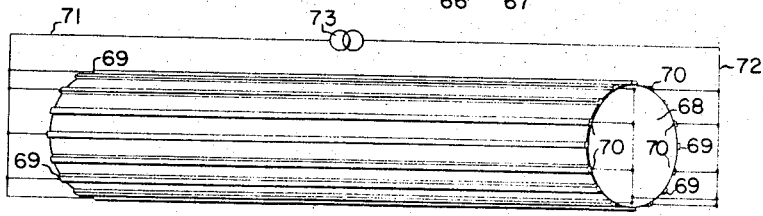
FIGURES 7 and 8 are perspective views of rods of electrostrictive material, illustrating the method of applying circumferential and helical polarizations, respectively.

To apply circumferential polarization to such a ferroelectric material, parallel lined electrodes may be applied to the surface as is shown in FIGURE 7. Here the rod 68, e.g., of ceramic containing between 80 and 95% barium titanate, has a plurality of this metallic electrodes 69, 70 in engagement with the rod parallel to the central axis. The electrodes 69 are connected to a common circuit 71 and the alternate electrodes 70 to a common circuit 72. A direct current voltage from a source 73 is connected to these circuits while the rod is heated to the Curie point and cooled. When a torsional strain is applied to the polarized rod a helical polarization results.

Figure 8:
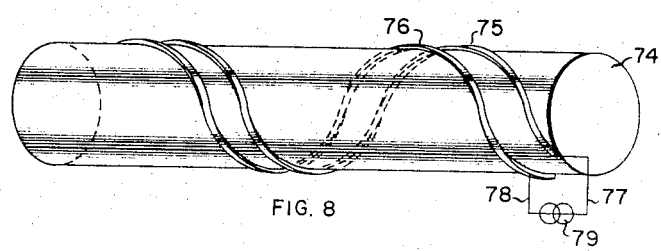

However, if the rod is to respond to both torsional and compressional strains, it is necessary to apply helical polarization to the rod. This is shown in FIGURE 8, wherein the rod is engaged by thin metallic electrodes 75, 76, which extend helically about the rod and are connected by circuits 77, 78 to a source 79 of direct current potential. Although only one pair of electrodes is shown, a greater number may be used, as indicated in FIGURE 7, to cover substantially the entire surface of the rod.

Figure 9:
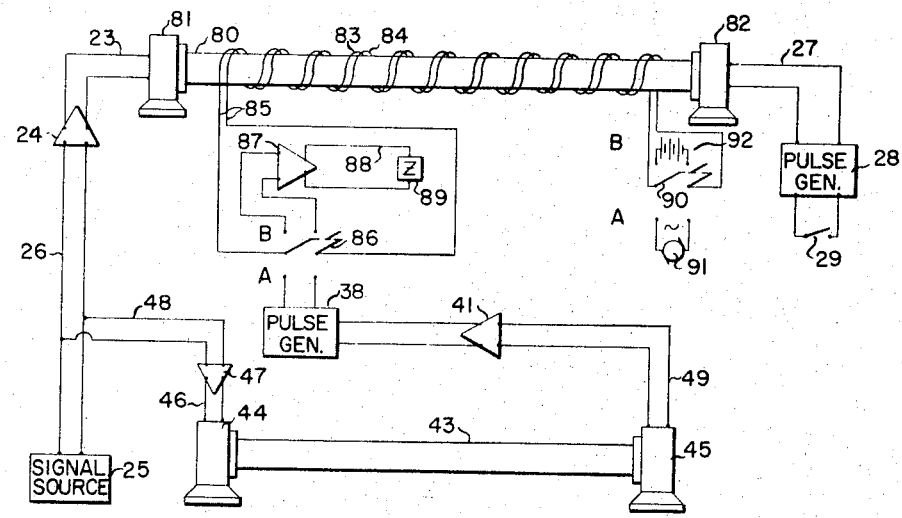
FIGURE 9 is a diagrammatic view of another embodiment of the invention wherein a memory rod of electrostrictive material is used, and recall is similar to the system of FIGURE 1.

An embodiment of the invention employing such an electrostrictive memory rod is shown in FIGURE 9, wherein the ferroelectric rod 80 has its ends mounted in transducers 81 and 82, the input circuits 23 and 27 of which are connected to elements 24–26 and 28–29, which are as previously described for FIGURE 1. The rod has one or more pairs of helical electrodes 83, 84 connected by a circuit 85 to a double-throw switch 86 which, when in its A-position, connects the circuit 85 to the pulse generator 38. Parts 38 and 41–49 are as previously described. The transducers 44, 45, 81 and 82 may be either of the torsional or compressional type, as was explained previously. When the switch is in its B-position the electrodes are connected to an output amplifier 87. The amplified output signal is taken off via a circuit 88 to a load 89. The electrodes are further connected to the poles of a switch 90 which may be a single-throw switch having at least the contacts indicated for the A-position by which the electrodes can be connected to a source 91 of alternating current the potential of which can be controlled. Optionally, the switch 90 is a doublethrow switch, as shown, and includes further a B-position, in which the electrodes 83, 94 are connected to a cource 92 of high direct current potential.

When the switch 90 is momentarily placed into its B-position, a remanent helical polarization is left in the rod 80. This operation, preliminary to storing a signal, is not always necessary; however, it is desirable to have an initial polarization to improve the sensitivity and the linearity of the storage system. The switch 90 is in open position while storing a signal.

To store a signal the switch 86 is placed in its A-position and the signal from the source 25 is applied simultaneously to the amplifiers 24 and 46 and, thence, to the transducers 81 and 44 to initiate torsional waves to the memory rod 80 and delay rod 43, which may be of the same type as the rod 80 or of other material. The signal wave reaches the transducer 45 before reaching the end of the rod 80, triggering the pulse generator 38 and applying a strong, short polarizing pulse of direct current voltage across the electrodes 83, 84. This imposes a helical polarizing field simultaneously along the length of the rod. When this pulse is ended the elements of the signal are stored along the memory rod as remanent polarizations and remanent strains.

To recall the information the switch 86 is moved to the B-position and the control 29 is operated to apply a sharp torsional strain of short duration to the end of the rod 80 from the transducer 82. This wave travels along the rod, producing a succession of voltages between the electrodes 83 and 84 which voltages are proportional to the remanent strains and, hence, to the amplitudes of the original signal elements. These voltages are amplified in the amplifier 87, and the original signal is reproduced in the circuit 88 and load 89. As before, the stored signal can be recalled repetitively without destroying it.

To erase the signal from the memory rod the switch 86 is opened and the switch 90 is placed in its A-position to connect the electrodes to alternating current potential. This is gradually diminished, thereby depolarizing the rod 80.

Figure 10:
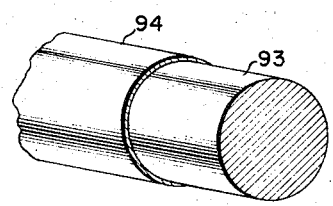
FIGURE 10 is a sectional perspective view of a modified form of memory rod wherein the magneto-electrostrictive material is applied as a coating.

Although certain specific embodiments of the use of magnetostrictive and electrostrictive rods were illustrated, it is evident that other physical arrangements may be used. For example, it is possible to bond a thin layer of either magnetostrictive or electrostrictive material to rods or wires of other materials which have different mechanical properties. This is shown in FIGURE 10, wherein a rod 93 of suitable structural material, such as steel, is coated with a layer 94 of magnetostrictive or electrostrictive material.

Figure 11:
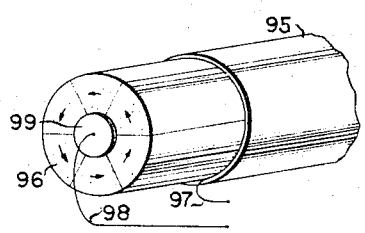
FIGURE 11 is a perspective view of an electrostrictive transducer applied to one end of a memory rod.

Electrostrictive material may also be used in the transducers. As is shown in FIGURE 11, a memory rod 95, which may be either magnetostrictive or electrostrictive, is fixed at the end thereof to a torsional wave transducer comprising a plurality, e.g., six pie-shaped sectors 96 of barium titanate or the like which have remanent polarizations in the directions tangential to the composite transducer, as indicated by the arrows. Each sector may be separately polarized or the sectors may be cut from a slab of material having remanent polarization and assembled in proper orientation. The flat ends of the composite transducer structure are provided with electrodes, e.g., by depositing a film of metal by vaporization on the ends and connecting the films to electrical connections 97 and 98, respectively, e.g., by one or more contact discs 99. The rod 95 can be attached to the metal-coated end of the transducer by an adhesive, e.g., an epoxy resin. The connections 97 and 98 are connected to the input circuit e.g., 23 or 46 of FIGURE 2. When the signal is applied to the electrodes each sector 96 is stressed in shear parallel to the flat faces, thereby producing a torsional stress in the end of the memory rod 95. It is understood that the transducer may be mounted as is shown in FIGURE 6, it being preferred not to clamp it.

Figure 12:
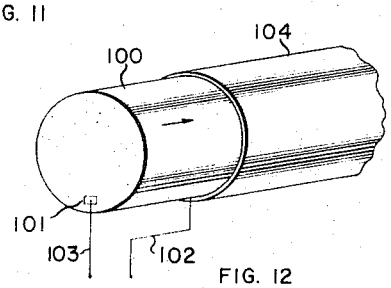
FIGURE 12 is a perspective view of a modified form of an electrostrictive transducer.

Another form of electrostrictive transducer, suitable for producing compressional waves, is shown in FIGURE 12. In this embodiment the transducer is a disc or rod 100 of electrostrictive material having remanent polarization in the direction parallel to the central axis, as indicated by the arrow, and similarly provided at its ends with electrode 101 of any suitable type electrically connected to wires 102 and 103 which form the input circuit. The transducer is connected, as before, to a memory rod 104. When the signal is applied to the wires 103 and 103 longitudinal compressional waves are generated, which stress the end of the memory rod.

In connecting transducer of FIGURES 6, 11 or 12 to the end of a rod, the efficiency with which the mechanical waves are generated depends upon the electromechanical impedance of the transducer and the manner in which it is coupled to the rod. The proper design of such transducers is well known and will not be further discussed.

Figure 13:
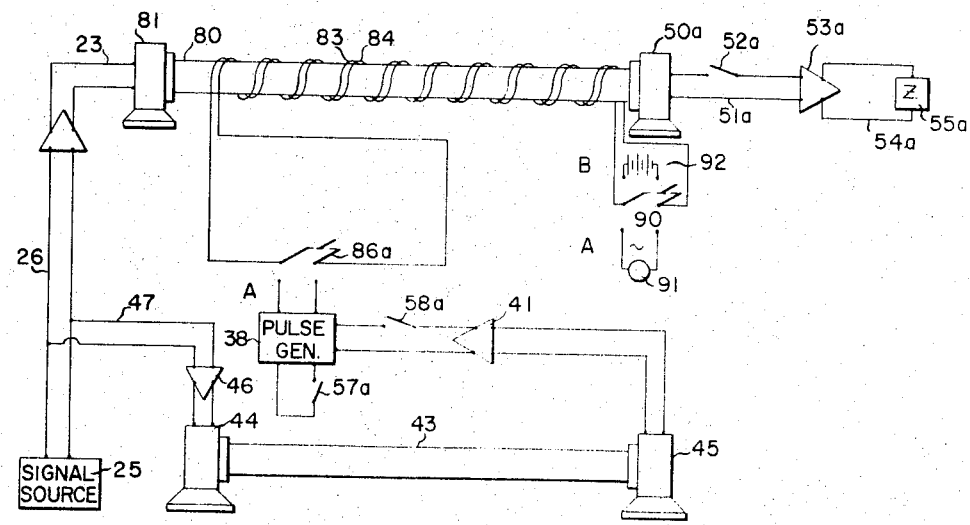
FIGURE 13 is a diagrammatic view of a further embodiment of the invention wherein a memory rod of electrostrictive material is used and the signal is recalled in a manner analogous to that of FIGURE 5.

FIGURE 13 shows an embodiment using an electrostrictive rod from which the signal is recalled in a manner that is completely analogous to that described for FIGURE 5. The device includes a ferroelectric memory rod 80 and all reference numbers smaller than 93 denote parts described for FIGURE 9. It will be noted that the switch 86a is of the single-throw type and that the amplifier 87 and associated elements are omitted; that the pulse generator 38 has a control element indicated by a switch 57a, for triggering it to emit a short, strong pulse; and that the pulse generator is connected to the amplifier 41 by a switch 58a. The transducer 82 of FIGURE 9 is replaced by a mechanical-electrical transducer 50a, the output circuit 51a of which is connected via a switch 52a to an amplifier 53a. The output of the latter is connected via a circuit 52a to a load 55a.

As was noted in connection with FIGURE 9, the switch is preferably placed momentarily in its B-position prior to storing a signal to place a remanent helical polarization into the rod, but this is not essential. The transducers may again be of the compressional or torsional types.

A signal is stored in the manner previously described for FIGURE 9, the switches 58a and 86a being closed and switch 90 open.

To recall the signal, the switch 90 is left open, switch 52a is closed, and switch 58a is opened. The controller element 57a is operated to cause the pulse generator 38 to induce a short polarization pulse into the rod 80 via the electrodes 83, 84. This change in polarization generates trains of elastic waves which travel along the rod in both directions and including both torsional and compressional components. The signals propagated toward the transducer 50a are similar to the original signal waves while those moving toward the transducer 81 will have the original time-sequence revesed. When transducer 50a is sensitive to torsional waves only, only these waves will be detected to reproduce in the amplifier 53a and in its output circuit 52a and load 55a a train of corresponding signals. These will correspond to the time-scale of the original signal when the transducer 81 was likewise of the torsioinal type. The same is true when both transducers 81 and 50a are of the compressional type. However, when the former is of the torsional type and the latter of the compressional type, the time-scale will be shortened, while if these types are reversed the time-scale will be lengthened.

In discussing the methods of this invention stress has been placed on the use of an initial helical polarization. This particular type of polarization is required if the information is stored using for example compressional waves and recovered by means of torsional waves. If only a single type of wave is to be used for storage and recall, it is not necessary to use any initial polarization. It may be desirable to use initial polarization to obtain a larger effect and thus improve the signal-to-noise ratio of the system.

We claim as our invention:

1. The method of storing and recalling a signal having an amplitude which varies irregularly with time, which comprises the steps of
   (a) storing said signal as remanent stresses and magnetizations in an elongate body by
      (1) magnetically polarizing an elongate body of a magnetostrictive material;
      (2) transducing said electrical signal into corresponding mechanical movements and applying the resulting movements as mechanical signal stresses to said polarized body;
      (3) propagating corresponding acoustic signal waves along the length of said polarized body; and
      (4) establishing a series of remanent stresses and magnetizations along the length of said body corresponding to said signal waves within the body by applying to said body simultaneously to points along the length thereof of a short magnetizing pulse having a magnetic vector orthogonal to the vector of said magnetic polarization during the said propagation of the signal waves; and
   (b) subsequently recalling the stored signal by applying a short magnetizing pulse simultaneously to said points along the length of the body, thereby initiating a series of acoustic waves within the body in accordance with the remanent stresses, transducing said waves at a fixed point of said body into electrical pulses, and reconstituting the signal by amplifying the resulting pulses.

2. The method of storing an electrical signal having an amplitude which varies irregularly with time which comprises:
   (a) initially electrically polarizing an elongate body of an electrostrictive material;
   (b) transducing said electrical signal into corresponding mechanical movements and applying the resulting movements as mechanical signal stresses to said polarized body;
   (c) propagating corresponding acoustic signal waves along the length of said polarized body; and
   (d) establishing a series of remanent stresses and electrical polarizations along the length of said body corresponding to said signal waves within the body by applying to said body simultaneously to points along the length thereof a short electrical polarizing pulse having an electric vector orthogonal to the electric vector of the initial electrical polarization during the propagation of the signal waves.

3. The method of storing and recalling a signal having an amplitude which varies irregularly with time, which comprises the steps of
   (a) storing said signal as remanent stresses and electrical polarizations in an elongate body by the steps defined in claim 2; and
   (b) subsequently recalling the stored signal by applying a short mechanical stress to the body and thereby propagating an acoustic recall pulse along the length of said body, detecting the changes in polarization along the length of the body as the pulse passes successive points in the body, and reconstituting the signal by amplifying the detected changes.

4. The method of storing and recalling a signal having an amplitude which varies irregularly with time, which comprises the steps of
   (a) storing said signal as remanent stresses and electrical polarizations in an elongate body by the steps defined in claim 2; and
   (b) subsequently recalling the stored signal by applying a short electrical polarizing pulse simultaneously to said points along the length of the body, thereby initiating a series of acoustic waves in accordance with the remanent stresses, transducing said waves at a fixed point of said body into electrical pulses, and reconstituting the signal by amplifying the resulting pulses.

5. The method of storing and recalling a signal having an amplitude which varies irregularly with time, which comprises the steps of
   (a) storing said signal as remanent stresses and polarizations in an elongate body by
      (1) applying said signal as a series of mechanical signal stresses to an elongate body of magnetostrictive material and propagating corresponding acoustic signal waves along the length thereof; and
      (2) establishing a series of remanent stresses and polarizations along the length of said body corresponding to said signal waves within the body by applying thereto simultaneously at different points along the length of the body a short polarizing pulse during the said propagation of the signal waves;
   (b) applying a short recall polarizing pulse simultaneously to said points along the length of the body, thereby initiating a series of acoustic recall waves within the body in accordance with the remanent stresses;

(c) one of said acoustic signal waves and said recall pulse being torsional and the other being compressional; and (d) detecting the magnitudes of said recall waves at a fixed point of said body whereby the time-scale of the detected recall waves is different from that of the original signal.

6. A device for storing a signal having an amplitude which varies irregularly with time which comprises:

(a) a rod of an electro-magnetostrictive material;

(b) an input element attached at a point of the bar for creating a series of mechanical signal stresses in said bar in response to an applied signal having an amplitude which varies with time to generate corresponding acoustic signal waves in said bar for propagation therealong;

(c) means for applying to said bar simultaneously along the length thereof a short polarizing pulse to establish a series of remanent stresses and polarizations along the length thereof corresponding to acoustic signal waves which occur within the bar at the instant that said polarizing pulse is applied;

(d) means for recalling the signal stored in said body, comprising (1) means for propagating a short acoustic recall wave along the length of said body, including means for applying a polarizing recall pulse simultaneously to points along the length of said body, thereby to initiate acoustic waves which propagate along the length thereof in accordance to the remanent stresses therein; and (2) means for sensing the magnitudes of said propagated waves at a fixed point in said body; and (e) said input element and said means for sensing the magnitudes of the waves being of different types, such that one interacts with compressional waves and the other with torsional waves, whereby the time scale of the detected wave magnitudes is different from that of the applied signal.

7. Device for storing an electrical signal having an amplitude which varies with time, which comprises:

(a) a magnetically polarized bar of a magnetostrictive material;

(b) an electrical-mechanical transducer having the input connected to said signal and mechanically coupled to said bar for creating therein a series of mechanical signal stresses corresponding to said signal;

(c) means for applying to said bar simultaneously along the length thereof a magnetizing pulse having a vector component which is orthogonal to the vector of initial polarization of the bar, thereby to establish a series of remanent stresses and magnetizations along the length thereof corresponding to acoustic signal waves which occur within the bar at the instant that said magnetizing pulse is applied;

(d) means for recalling the signal from the bar which comprises electrical means for applying to said bar a short recall magnetization pulse simultaneously along the length of the bar, thereby to initiate acoustic waves which propagate along the length of the bar in correspondence to the remanent stresses therein;

(e) a second transducer for detecting the said acoustic waves at a point of the bar; and (f) one of said transducers being of the torsional type, the other of the compressional type whereby the signal emitted by the second transducer has a time-scale which is different from that of the original signal.

8. Device for storing an electrical signal having an amplitude which varies irregularly with time, which comprises:

(a) an electrically polarized bar of an electrostrictive material;

(b) an electrical-mechanical transducer having the input connected to said signal and mechanically coupled to said bar for creating therein a series of mechanical signal stresses corresponding to said signal;

(c) means for applying to said bar simultaneously along the length thereof an electrical polarizing pulse having a vector component which is orthogonal to the vector of initial polarization of the bar, thereby to establish a series of remanent stresses and polarizations along the length thereof corresponding to acoustic signal waves which occur within the bar at the instant that said magnetizing pulse is applied;

(d) a second transducer for recalling the signal from the bar which comprises means for applying to said bar a short mechanical stress, thereby to propagate an acoustic recall wave along the bar;

(e) means electrically connected to said bar for detecting changes in polarization of the bar as said recall wave passes successive points along the bar; and (f) one of said transducers being of the torsional type and the other of the compressional type, whereby the signal detected in said electrically connected means has a time-scale which is different from that of the original signal.

9. Device for storing an electrical signal having an amplitude which varies irregularly with time, which comprises:

(a) an electrically polarized bar of an electrostrictive material;

(b) an electrically-mechanical transducer having the input connected to said signal and mechanically coupled to said bar for creating therein a series of mechanical signal stresses corresponding to said signal;

(c) means for applying to said bar simultaneously along the length thereof an electrical polarizing pulse having a vector component which is orthogonal to the vector of initial polarization of the bar, thereby to establish a series of remanent stresses and polarizations along the length thereof corresponding to acoustic signal waves which occur within the bar at the instant that said magnetizing pulse is applied;

(d) means for recalling the signal from the bar which comprises electrical means for applying to said bar a short electrical recall polarizing pulse simultaneously along the length of the bar, thereby to initiate acoustic waves which propagate along the length of the bar in correspondence to the remanent stresses therein;

(e) second transducer for detecting the said acoustic waves at a point of the bar; and (f) one of said transducers being of the torsional type and the other of the compressional type, whereby the signal emitted by the second transducer has a time-scale which is different from that of the original signal.

References Cited

UNITED STATES PATENTS 3,127,578 3/1964 Long _____ 340—174
3,173,131 3/1965 Perucca _____ 340—174

FOREIGN PATENTS 873,367 7/1961 Great Britain.

BERNARD KONICK, *Primary Examiner.*

M. S. GITTES, *Assistant Examiner.*